United States Patent
Kanayama et al.

(10) Patent No.: US 10,095,772 B2
(45) Date of Patent: Oct. 9, 2018

(54) CALCULATION OF A DEGREE OF SIMILARITY OF USERS

(71) Applicant: INTERNATIONAL BUSINESS MACHINES CORPORATION, Armonk, NY (US)

(72) Inventors: Hiroshi Kanayama, Kanagawa-ken (JP); Akihiro Kosugi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 15/004,561

(22) Filed: Jan. 22, 2016

(65) Prior Publication Data

US 2017/0212950 A1   Jul. 27, 2017

(51) Int. Cl.
   *G09B 7/02* (2006.01)
   *G06F 17/30* (2006.01)

(52) U.S. Cl.
   CPC ......... *G06F 17/30598* (2013.01); *G09B 7/02* (2013.01)

(58) Field of Classification Search
   None
   See application file for complete search history.

(56) References Cited

U.S. PATENT DOCUMENTS

| | | | | |
|---|---|---|---|---|
| 5,727,950 A * | 3/1998 | Cook | ............. | G09B 5/02 434/350 |
| 5,944,530 A * | 8/1999 | Ho | ............. | G09B 5/06 434/236 |
| 8,442,423 B1 * | 5/2013 | Ryan | ............. | G09B 7/00 434/322 |
| 9,087,321 B2 | 7/2015 | Neal et al. | | |
| 2001/0046658 A1 * | 11/2001 | Wasowicz | ............. | G09B 5/065 434/167 |
| 2005/0266387 A1 * | 12/2005 | Rossides | ............. | G09B 7/00 434/323 |
| 2006/0172275 A1 * | 8/2006 | Cohen | ............. | G09B 7/00 434/350 |
| 2006/0194185 A1 * | 8/2006 | Goldberg | ............. | G06Q 10/06311 434/350 |
| 2007/0009870 A1 * | 1/2007 | Kallander | ............. | G09B 7/06 434/350 |
| 2007/0282791 A1 | 12/2007 | Amzalag et al. | | |
| 2009/0197235 A1 * | 8/2009 | Tormey | ............. | G09B 7/00 434/350 |
| 2009/0239205 A1 * | 9/2009 | Morgia | ............. | G06Q 10/10 434/362 |

(Continued)

*Primary Examiner* — Paul A D'Agostino
(74) *Attorney, Agent, or Firm* — Tutunjian & Bitetto, P.C.; Vazken Alexanian

(57) ABSTRACT

A method, a computer system, and a computer program product are provided for calculating a degree of similarity of users. Each user may be a preparer and an answerer of one or more quizzes. The method includes collecting one or more quizzes from one or more users as preparers and providing the collected quizzes to one or more user as answerers. The method further includes collecting one or more answering activities of one or more answerers to the provided quizzes from the one or more answerers, wherein a pair includes a preparer and an answerer. The method additionally includes calculating, for each pair, a degree of similarity of knowledge background, based on the one or more answering activities of the one or more answerers.

18 Claims, 5 Drawing Sheets

(56) References Cited

U.S. PATENT DOCUMENTS

| | | | | |
|---|---|---|---|---|
| 2009/0280465 A1* | 11/2009 | Schiller | ............... | G06Q 10/10 434/350 |
| 2010/0159432 A1* | 6/2010 | German | ............... | G06Q 10/10 434/350 |
| 2011/0008758 A1* | 1/2011 | Kortas | ............... | G09B 7/02 434/219 |
| 2011/0250580 A1* | 10/2011 | Sandeep, Sr. | ............... | G09B 7/02 434/362 |
| 2011/0256517 A1* | 10/2011 | Swanson | ............... | G09B 19/00 434/236 |
| 2012/0231441 A1* | 9/2012 | Parthasarathy | ............... | G09B 7/02 434/362 |
| 2012/0282587 A1* | 11/2012 | Lofthus | ............... | G09B 3/00 434/335 |
| 2012/0308968 A1* | 12/2012 | Leinonen | ............... | G09B 19/06 434/156 |
| 2013/0171594 A1* | 7/2013 | Gorman | ............... | G09B 5/00 434/219 |
| 2014/0004495 A1* | 1/2014 | Singh | ............... | G09B 7/02 434/322 |
| 2014/0067944 A1 | 3/2014 | Jackson et al. | | |
| 2014/0377735 A1* | 12/2014 | Byron | ............... | G09B 7/02 434/362 |
| 2015/0044647 A1* | 2/2015 | Koyanagi | ............... | G06Q 10/10 434/219 |
| 2015/0099254 A1* | 4/2015 | Kamimaeda | ............... | G06F 17/30 434/322 |
| 2015/0310754 A1* | 10/2015 | Bilic | ............... | G06F 17/30867 434/322 |

* cited by examiner

301

Please prepare a quiz relating to a tourist spot in Tokyo.

311

| Tokyo National Museum | Rikugien | Yanaka | 312 |
| Tokyo Skytree | Ueno Park | Ameyoko | |
| Asakusa | Tokyo Solamachi | Ikebukuro | |
| Sensoji Temple | Sumida Aquarium | Kappabshi Street | |
| Edo-Tokyo Museum | Botanical Garden | Ryogoku | |

314  315
[Next] [Cancel]

313
User ID: XXXXX

---

321

Please answer quizzes relating to a tourist spot in Tokyo.

Quiz  331

Where is the city park with multiple museums and a zoo?

(Remaining 99 quizzes)

Answer  332

Ueno Park 334  335
[Next] [Cancel]

333
User ID: YYYYY

FIG. 3

CALCULATION OF A DEGREE OF SIMILARITY OF USERS

BACKGROUND

This invention relates to a technique for calculating a degree of similarity of users.

SUMMARY

A game is provided as a social application in which one of participants gives quizzes on a particular topic and the others answer them. For example, participants are asked to post a quiz on the domain of sightseeing spots in Tokyo, by referring to a relevant Wikipedia article, and also they are asked to pick a created quiz by someone else and try to answer it. Any of the participants can be a preparer of the quizzes, and any participants other than the preparer can answer those quizzes.

This game is a task to build up the training data for question-answering systems by collecting a pair of a quiz and its answer.

In this game, participants tend to post quizzes from different perspectives, even for an identical answer: for example, someone may post a quiz about the Tokyo Dome with a clue on a concert in the Tokyo-Dome, and another person may post with a clue on a baseball team based on the Tokyo-Dome, even if the answers to both quizzes are "Tokyo-Dome". The participants are making entirely different quizzes by using their knowledge background.

Another feature in this task is variance in a response time, and the percentage of correct answers among the answerers: a user who knows well enough about a domain of the quiz will be able to answer correctly in a short time. As a consequence, a quiz in which a particular group of users answered correctly in a short time, while others took a long time or answered incorrectly, may be a quiz that is asking questions regarding specific knowledge of that area. Further, there are quizzes which are so obvious that everyone can answer easily, or quizzes which are so complicated or personal that no one can answer.

According to one aspect of the present invention, an embodiment of the present invention provides a computer-implemented method for calculating a degree of similarity of users. Each user may be a preparer and answerer of one or more quizzes. The method comprises collecting one or more quizzes from one or more users as a preparer; providing the collected quizzes to one or more users as an answerer; collecting one or more answering activities of the one or more answerers to the provided quizzes from the one or more answerers; and calculating, for each pair of the one or more preparers and the one or more answerers, a degree of similarity of knowledge background, based on the one or more answering activities of the one or more answerers.

According to another aspect of the present invention, a system comprising a computer readable storage medium storing a program of instructions executable by the computer system to perform one or more methods described herein may be provided.

According to another aspect of the present invention, a computer program product comprising a computer readable storage medium storing a program of instructions executable by the computer system to perform one or more methods described herein also may be provided.

BRIEF DESCRIPTION OF THE DRAWINGS

FIG. 3 illustrates embodiments of a graphic user interface for inputting a quiz and a graphic user interface for inputting an answer, which can be used according to an embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
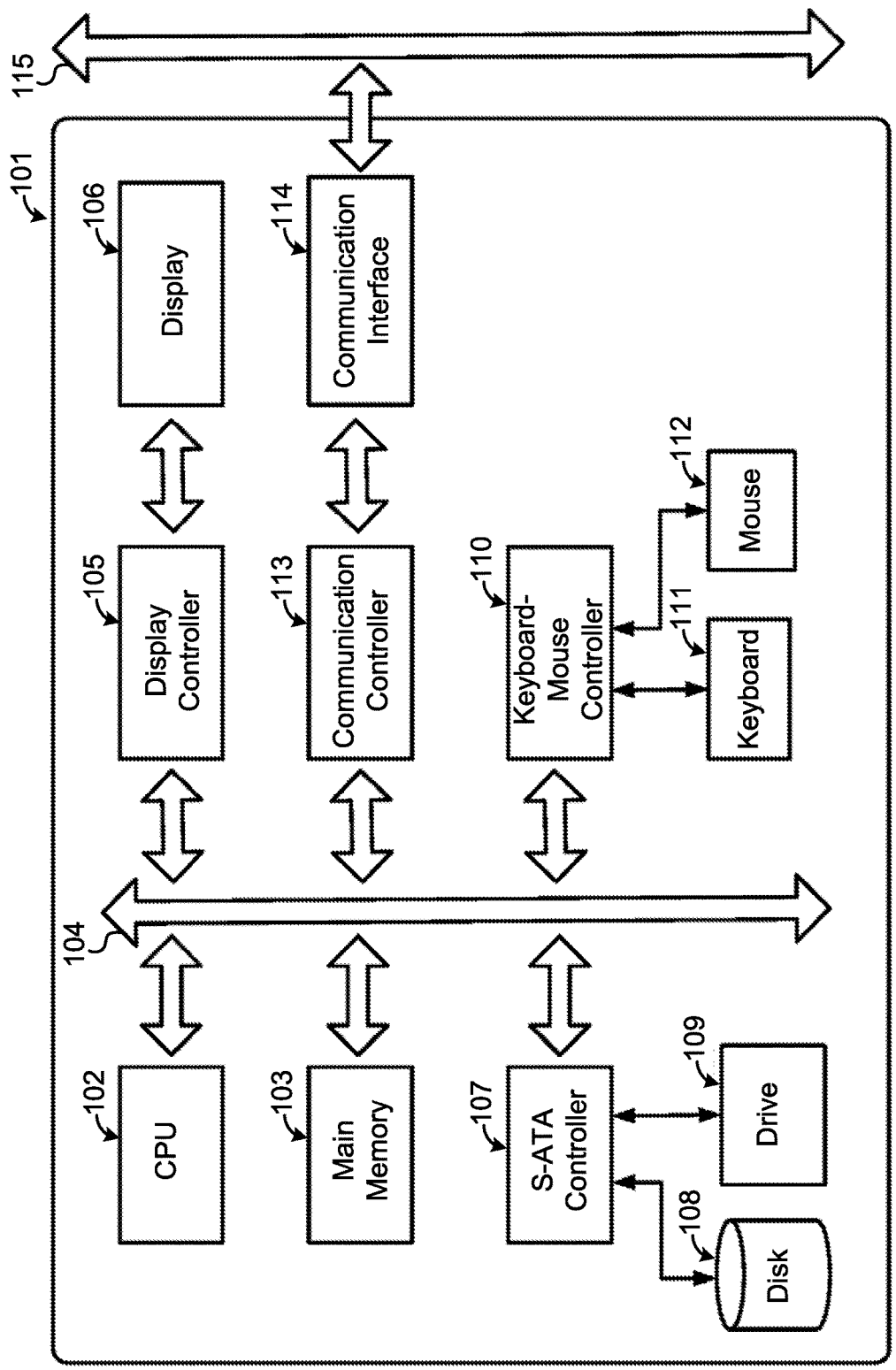
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2A and 2B, FIG. 3 and FIG. 4.

The idea of an embodiment of the present invention is on the basis of a perception that a preparer of a quiz and an answerer of the quiz have similar or different knowledge background. Therefore, if the preparer and the answerer have a similar knowledge background, it is assumed that the answerer may easily answer the quiz, while if the preparer and the answerer have a different knowledge background, it is assumed that the answerer may have a difficulty to answer the quiz. Accordingly, knowledge backgrounds of the preparer and the answerer can be utilized in an embodiment of the present invention.

Figure 2A:
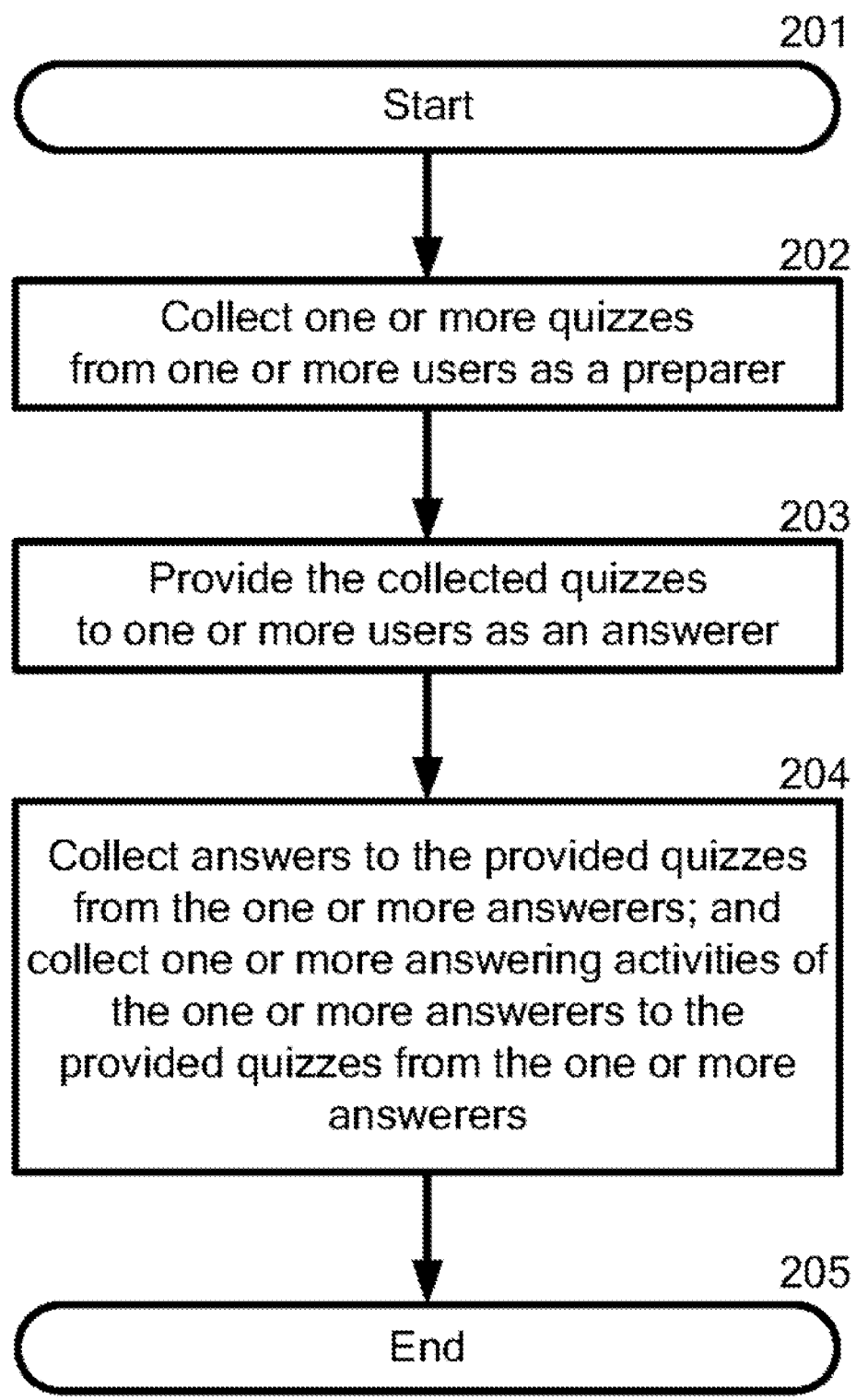
FIG. 2A illustrates an embodiment of a flowchart of a process for collecting one or more quizzes and one or more answering activities of the one or more answerers.
Figure 2B:
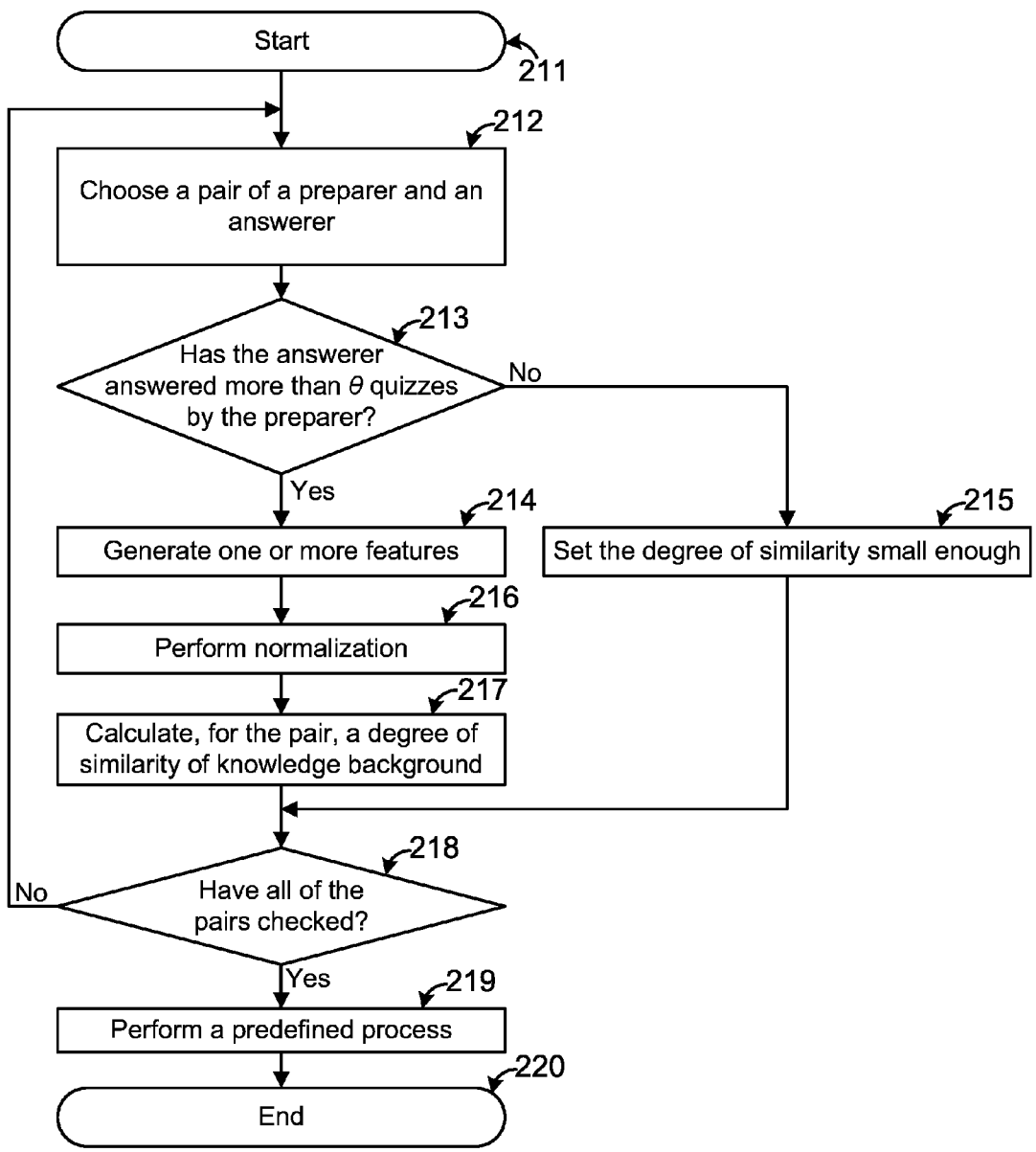
FIG. 2B illustrates an embodiment of a flowchart of a process for calculating a degree of similarity of users.

FIGS. 2A and 2B illustrate a flowchart according to an embodiment of the present invention. A system such as the computer (101) performs the process described in FIGS. 2A and 2B. The system may be implemented as a single computer or plural computers.

With reference now to FIG. 2A, FIG. 2A illustrates one embodiment of a flowchart of a process for collecting one or more quizzes and one or more answering activities of the one or more answerers.

Prior to start of step 201 mentioned below, a user terminal, which may be used by a preparer of one or more quizzes, may request the system to send a page, for example, a web page for inputting one or more quizzes to the user terminal. In one embodiment, the user terminal may be for example, but not limited to, a computer, a tablet or a smartphone. In another embodiment, the user terminal is the same as the system. In response to the request from the user terminal, the system may provide the page to the user terminal. After the user terminal displays the page on a graphical user interface, the preparer can input one or more quizzes into the page.

One or more quizzes are prepared by inputting one or more quizzes through the graphical user interface for inputting one or more quizzes. An example of the user graphical user interface for inputting one or more quizzes is illustrated in FIG. 3, the upper part, mentioned below.

The number of user as a preparer may be one or more. Each preparer may be first provided a group of answers and, then, prepare a quiz such that an answer to the quiz is the identical with one answer in the group. The group of answers may be provided according to any genre, for example, but not limited to, music, film, history, science, geography, books or tourist spot, or any operation manual of any device, any field of high degree of professionalism or any language.

Each preparer may refer to an encyclopedia, such as an electronic encyclopedia, for example, but not limited to, Wikipedia, to prepare a quiz.

Even though the same answer, each user prepares a quiz in different point of view due to her or his knowledge background. Accordingly, different quizzes are prepared by different users.

One or more prepared quizzes may be stored in a storage, such as a local disk (108) or network disk server, such as a cloud disk server, to which the system can access.

Each quiz may be associated with an identifier, such as a personal ID, of a preparer who made the quiz. This identifier may be used for identifying a preparer of a quiz.

In step 201, the system starts the process for collecting one or more quizzes and answers to the quizzes.

In step 202, the system collects one or more quizzes from one or more users as a preparer. In one embodiment, the system may read the one or more quizzes from the storage(s) in which the one or more quizzes are stored. In another embodiment, the system may receive the one or more quizzes which are directly inputted in the system or which are sent from the user terminal.

When there is a plurality of users, the users may constitute a user group among which a degree of similarity of knowledge background is calculated. Each user may prepare one or more quizzes. Each user may be associated with a unique identifier, such as a personal ID. The personal ID may be used for identifying a preparer of a quiz.

In step 203, the system provides the collected quizzes to one or more users as an answerer.

The number of users as an answerer may be one or more. The answerer may be the same of all or parts of preparers. The answerer may comprise a person other than the preparer. Therefore, each user may be a preparer and answerer among the user group. However, a user may not necessarily be a preparer and answerer. Accordingly, the preparer may not be the answerer or vice versa.

The system may provide the collected quizzes, according to an instruction from each answerer. In one embodiment, the system may send the one or more quizzes to the user terminal. In another embodiment, the system may display the one or more quizzes on a display connected to the system.

In one embodiment, the presentation of the quizzes to each user may be performed at different times by each answerer. In another embodiment, the presentation of the quizzes to each user may be started at the same time.

The system may read the collected quizzes from the storage. The system may provide the quizzes through a graphical user interface for inputting answers to the provided one or more quizzes. An example of the user graphical user interface for inputting answers is illustrated in FIG. 3, the lower part, mentioned below.

Each user inputs an answer to the quiz through the graphical user interface for inputting answers. The system collects answers from each answerer.

The one or more answer may be stored in a storage, such as a local disk (108) or network disk server, such as a cloud disk server, to which the system can access.

Each answer may be associated with an identifier, such as a personal ID, of an answerer who answered the quiz. This identifier may be used for identifying an answerer of a quiz.

In one embodiment when the user answers the quiz on the user terminal, the user terminal may measure or collect one or more answering activity by the user. In another embodiment, the user answers the quiz on the system; the system may measure or collect one or more answering activity by the user.

The answering activity may be any activity when each answerer answers the quiz. Examples of the answering activity may be for example, but not limited to, response time for each answerer to reach correct answers, the number of web pages that each answerer referred to before reaching correct answers, or a combination thereof.

The answer activity can be monitored and recorded by the user terminal or the system, for example, but not limited to, using a timer of measuring answer time (namely, response time) for each quiz, a counter of measuring the number of web pages that each answerer referred to before reaching correct answers.

The one or more answering activity may be stored in a storage, such as a local disk (108) or network disk server, such as a cloud disk server, to which the system can access.

Each answering activity may be associated with an identifier, such as a personal ID, of an answerer who answered the quiz. This identifier may be used for identifying an answerer of a quiz.

In step 204, the system collects one or more answers to the provided quizzes from each answerer. In one embodiment, the system may read the one or more answers from the storage(s) in which the one or more answers are stored. In another embodiment, the system may receive the one or more answers which are directly inputted in the system or which are sent from the user terminal.

In step 204, the system may further collect answering activities of each answerer. In one embodiment, the system may read the one or more answering activities from the storage(s) in which the one or more answering activities are stored. In another embodiment, the system may receive the one or more answering activities which are directly inputted in the system or which are sent from the user terminal. When the system may receive the one or more answer, the system may simultaneously or separately receive the answering activity relating to the answer.

In step 205, the system terminates the process mentioned above.

With reference now to FIG. 2B, FIG. 2B illustrates one embodiment of a flowchart of a process for calculating a degree of similarity of users.

In step 211, the system starts the process for calculating a degree of similarity of users. The step 211 may be started immediately after collecting one or more quizzes and answering activity, or any time after collecting one or more quizzes and answering activity.

In step 212, the system chooses a pair of a preparer and an answerer. The identifier of the preparer in the pair is different with that of the answerer in the pair, because it needs to exclude a case where the same user is chosen as the pair.

Please note that if each of the number of the preparer and the answerer is one, the preparer is the same person with the answerer. In such a case, it cannot possible to calculate a degree of similarity of users. Accordingly, it is apparent that a case is excluded where each of the number of the preparer and the answerer is one.

In an optional step 213, the system judges whether answerer answered more than θ quizzes by the preparer or not. The parameter, θ, may be the minimum value of answerer's (Hereinafter "answerer" may be also referred to as A) answering activities to preparer's (Hereinafter "preparer" may be also referred to as P) quiz. The parameter, θ, can be defined or adjusted by an administrator of the system. This judgment is performed for the purpose of guarantee the reliability of features mentioned in step 214 mentioned below. If the judgment result is positive, the system proceeds to a step 214, while, if the judgment result is negative, the system proceeds to the step 215. This is performed at the time when the answerer answers at least a predetermined number of the quizzes by the preparer.

In an optional step 214, the system generates one or more features from the answering activities for the pair. The feature refers to any data which is calculated from the one or more answering activities of the one or more answerers. When the features, c1 (the correct answer rate by A to P's quiz), t1 (the average response time that A spent time to reach a correct answer for P's quiz) and s1 (the average number of web pages that A referred to before A reached a correct answer to P's quiz) mentioned below, are calculated, the feature may refer to any data which is calculated from the one or more answering activities of one answerer. When the normalization mentioned below is calculated, the feature may refer to any data which is calculated from on one or more answering activities of a plurality of answerers. This is because a standard deviation to the quizzes by plurality of answerers may be used as a weight for identifying values corresponding to t1 and S1.

Any features which can be useful for calculating a degree of similarity of knowledge background may be utilized. The feature may be any rate value or average value which is calculated from the one or more answering activities of the one or more answerers. A person skilled in the art can set the feature, according to her or his knowledge.

In one embodiment, the one or more features are selected from at least one of a correct answer rate of each answerer, an average response time for each answerer to reach correct answers, and the average number of web pages that each answerer referred to before reaching correct answers.

The one or more generated features may be used in the following step 216 to perform normalization or in the following step 217 to calculate a degree of similarity of knowledge background, based on the one or more generated features.

Let us suppose that for each pair of users includes "P" who set one or more quizzes and "A" who answered the one or more quizzes. The system collects features of answering activities for each A. The features will be described as follows.

[c1]: the correct answer rate by A to P's quiz;

[t1]: the average response time that A spent time to reach a correct answer for P's quiz; and

[s1]: the average number of web pages that A referred to before A reached a correct answer to P's quiz.

In another embodiment of a feature, the system may perform the following supplemental algorithms. Some of the answers judged incorrect by the system may be actually correct, typically when the answer is a synonym of the correct answer and it is still unknown for the system. To address this situation, another status of the judgment, "ambivalent", can be introduced in addition to an answer of "correct" or "incorrect". Features regarding to the ambivalent status can be used for updating an equation for calculating a degree of similarity of knowledge background, as stated below.

In an optional step 215, the system sets the degree of similarity of the pair small enough. By this, it is considered that there is no similarity between the preparer and the answerer.

In an optional step 216, the system performs normalization on at least one of the correct answer rate, the average response time and the average number of web pages by standard deviation of results by one answerer, standard deviation of all results for one quiz, or standard deviation of results for the quizzes by one preparer to obtain normalization result.

The normalization result may be used in the following step 217 to calculate a degree of similarity of knowledge background, based on the normalization result. In one embodiment, the normalization result is used in the following equation for calculating a degree of similarity of knowledge background.

$$\alpha*c+\beta/t+(1-\alpha-\beta)/s$$

where each of c, t and s is value of answering activity or feature and $\alpha$ and $\beta$ are coefficients above 0 such that $\alpha+\beta$ is smaller than 1. The coefficients $\alpha$, $\beta$, or a combination of these may be zero, if required.

In one embodiment of the equation mentioned above, c is $c_1$, t is $t_1$, and s is $s_1$, where $c_1$, $t_1$ and $s_1$ each are those mentioned above.

In one embodiment, the normalization result may be used as "c", "t" or "s", in the equation mentioned above.

The features subjected to perform normalization can be selected from the correct answer rate, the average response time, the average number of web pages or combination thereof and, more especially, from the average response time, the average number of web pages or combination thereof.

The results in standard deviation of results by one answerer, standard deviation of all results for one quiz and standard deviation of results for the quizzes by one preparer may be the average response time, the average number of web pages or combination thereof.

In the following examples, three embodiments are shown for performing normalization.

In the three embodiments, value of tn is normalized or emphasized by a standard deviation for each answerer or for each quiz.

One embodiment is to perform normalization on features by standard deviation of results by one answerer. The results by one answerer may be the average response time or the average number of web pages. For example, the normalization example in this embodiment will be described as follows.

[tn]: each response time for a quiz between the pair;
[ta]: average response time for all quizzes by the answerer; and
[ts]: standard deviation of response time for all quizzes by the answerer t in the above equation will be represented as the average of (tn−ta)/ts In this embodiment above, tn is normalized by using to and ts, and an average of (tn−ta)/ts is calculated. The average is used as t in the equation mentioned above. Differences in ability on using tools or applications of each answerer may cause a different time for answering quiz. User who tends to need more time to answer the quiz due to the differences in ability on using tools or applications may be positioned at far distance. The ability on using tools or applications may be for example, but not limited to, a speed of typing keys, an operation of a mouse, a knowledge of operating an application, such as a web browser or search application. However, when the embodiment above is applied, dispersion due to differences in knowledge background of each answerer may be reduced.

The above-mentioned embodiment of the average response time may apply also to the average number of web pages. Accordingly, s in the above equation will be represented as the average of (sn−sa)/ss, wherein [sn] is each number of web pages that answerer in the pair referred to before reaching correct answer for a quiz, [sa] is average number of web pages that answerer referred to before reaching correct answers for all quizzes, and [ss] is standard deviation of number of web pages that answerer referred to before reaching correct answers for all quizzes.

Another embodiment is to perform normalization on features by standard deviation of all results for one quiz. The results for one quiz may be the average response time. For example, the normalization example in this embodiment will be described as follows.

[tn]: each response time for a quiz between the pair; and
[ts]: standard deviation of response time for all quizzes by the answerer t in the above equation will be represented as the average of (tn*ts).

In this another embodiment, standard deviation ts is calculated for response time for each quiz for all answerers, the calculated ts is multiplying by tn and, then, an average of (tn*ts) is calculated. The average is used as t in the equation mentioned above. When this another embodiment is applied, a better quality of quiz is emphasized.

In a conventional normalization, a value is divided by standard deviation. Meanwhile, in this another embodiment, a value is multiplied by a standard deviation. A quiz which can be answered by anyone, such as current news, does not depend on background knowledge of an answerer. However, if a quiz relates to a special field, a person who has a background knowledge of such special filed may easily answer the quiz relating the special field, while a person who does not have a background knowledge of such special field may have difficulty to answer the quiz. As a result, a deviation of t becomes larger. The quiz relating the special field is an appropriate quiz for measuring a knowledge background. Therefore, result value of the quiz relating the special field may be amplified by multiplying the value by a standard deviation. Accordingly, it is expected that a result having a good quality may be obtained by multiplying the value by a standard deviation.

The above-mentioned another embodiment of the average response time may apply also to the average number of web pages. Accordingly, s in the above equation will be represented as the average of (sn*ss), wherein [sn] is each number of web pages that answerer in the pair referred to before reaching correct answer for a quiz and [ss] is standard deviation of the number of web pages that answerer referred to before reaching correct answers for all quizzes.

Further, another embodiment is to perform normalization on features by standard deviation of results for the quiz set by one participant. Any normalization can be performed, according to this embodiment, by referring to the present specification.

In step 217, the system calculates, for the pair, a degree of similarity of knowledge background.

The calculation of a degree of similarity of knowledge background is performed by any one of the following embodiment.

1. When the optional steps 214 to 216 are not performed, the degree of similarity is calculated based on one or more answering activities of the one or more answerers.

2. When the optional step 214 is performed and the optional step 216 is not performed, the degree of similarity is calculated based on the one or more features.

3. When the optional steps 214 and 216 are performed, the degree of similarity is calculated based on the normalization result.

Any equation for calculation of a degree of similarity between P and A can be used. In one embodiment, the calculation of a degree of similarity between P and A may be calculated using the equation, $\alpha*c+\beta/t+(1-\alpha-\beta)/s$, as mentioned above. This equation is for calculating a distance between the pair.

For example, two users, P and A, should be closer when value of c is higher and when values of t and s are lower.

In the equation, the value of coefficients parameters $\alpha$, $\beta$, or combination of them can be varied arbitrarily by an administrator of the system. The value of $\alpha$ and $\beta$ can be varied arbitrarily, according to the administrator's knowledge. In one embodiment, when the correct answer rate is biased, the value of $\alpha$ will be decreased and the value of $\beta$ will be increased, on condition that $\alpha$ and $\beta$ are above 0 and $\alpha+\beta$ is smaller than 1. In another embodiment, both of the values of $\alpha$ and $\beta$ may be increased or decreased on condition that $\alpha$ and $\beta$ are above 0 and $\alpha+\beta$ is smaller than 1.

The degree of similarity of knowledge background infers closeness between the pair, namely a preparer and an answerer.

In step 218, the system judges whether all of the pairs has been checked or not. If the judgment result is positive, the system proceeds to a step 219, while, if the judgment result is negative, the system proceeds back to the step 212 in order to repeat the steps 212 to 218.

In step 219, the system performs a predefined process. A degree of similarity of knowledge background may be utilized for the purpose of grouping or ordering the users.

In one embodiment, the predefined process may he selected from any one of the followings: (a) to cluster the users according to the degrees of similarity, (b) to select one or more pairs of the one or more preparers and the one or more answerers having a predetermined degree of similarity, (c) to select one or more pairs of the one or more preparers and the one or more answerers having a predetermined threshold or more of a degree of similarity, or (d) sort the users according to the degrees of similarity.

By performing the predefined process, it may be possible, for example, to make a good people grouping (for example, for training courses) with members having similar interests or backgrounds, to distribute people to diversity background knowledge so that each group can easily solve a task or produce innovative ideas, or to determine an interest or knowledge level for a user. In one embodiment of the present principles, the users having similar interests or backgrounds may be identified on the display 106 (FIG. 1) to, e.g., enable the users to be properly grouped with other users having similar interests or backgrounds. These identities may also be transmitted over a server or the Internet by means of, e.g., an e-mail or other form or digital communication. These identities may be used by companies to enable the companies to determine the positions in which each of their employees should be placed, or to determine which employees should be assigned to each individual task. These identities may also be used by schools. The schools may, e.g., use the information to better understand the strengths and weaknesses of the individual students. It is noted that the use of these identities is not limited by these examples.

In step 220, the system terminates the process mentioned above.

According to one embodiment of the present invention, the calculation of a degree of similarity of knowledge background can be done without a dictionary of knowledge domain or languages to extract relevant keywords to distinguish the domain specific knowledge, unlike the known techniques such as friend suggestions in Facebook®.

According to one embodiment of the present invention, less workload is necessary for users to bring out what they know about the area. Answering a quiz according to one embodiment of the present invention is an intuitive task, compared to writing documents. Further, the users are allowed to escape from the quizzes that they are not familiar with and, therefore, this reduces the percentage of correct answers and contributes the confidence in the variable to estimate a degree of similarity of knowledge background among the uses. By stating the area of the quizzes to be collected, such as sightseeing spots in Tokyo, an administrator of the system, such as a moderator, can control focused domains.

With reference not to FIG. 3, FIG. 3 illustrates embodiments of graphic user interfaces, GUI, which can be used according to an embodiment of the present invention.

The GUI (301) is used for inputting a quiz by a user as a preparer. The GUI (301) shows an area for inputting a quiz (311), a list of the answers (312) and, optionally, a user ID (313). The GUI (301) further shows a next button (314) and a cancel button (315).

The area (311) is used by a user for inputting a quiz.

The list (312) may be used for making a quiz. The list (312) may be provided by an administrator of the system. The list may be chosen according to the purpose of ordering the user.

The user ID (313) may be used for identifying a user who made the quiz. The user ID (313) may be stored in a storage together with the input quiz.

The next button (314) may be used for making a next quiz.

The cancel button (315) may be used for cancellation of making a quiz or stopping making a quiz.

The GUI (321) is used for inputting an answer by a user as an answerer. The GUI (321) shows an area for displaying a quiz (331), an area for inputting an answer to the quiz (332) and a user ID (333). The GUI (321) further shows a next button (334) and a cancel button (335).

The area (331) is used for displaying a quiz to the user. The GUI (321) further shows the total number of quizzes or the remaining number of the quizzes to be answered, for example near the area (331).

The area (332) is used for inputting an answer to the quiz displayed in the area (313).

The user ID (333) may be used for identifying a user who answered the quiz. The user ID (333) may be stored in a storage together with the input answer.

The next button (334) may be used for answering a next quiz.

The cancel button (335) may be used for cancellation of answering a quiz.

Figure 4:
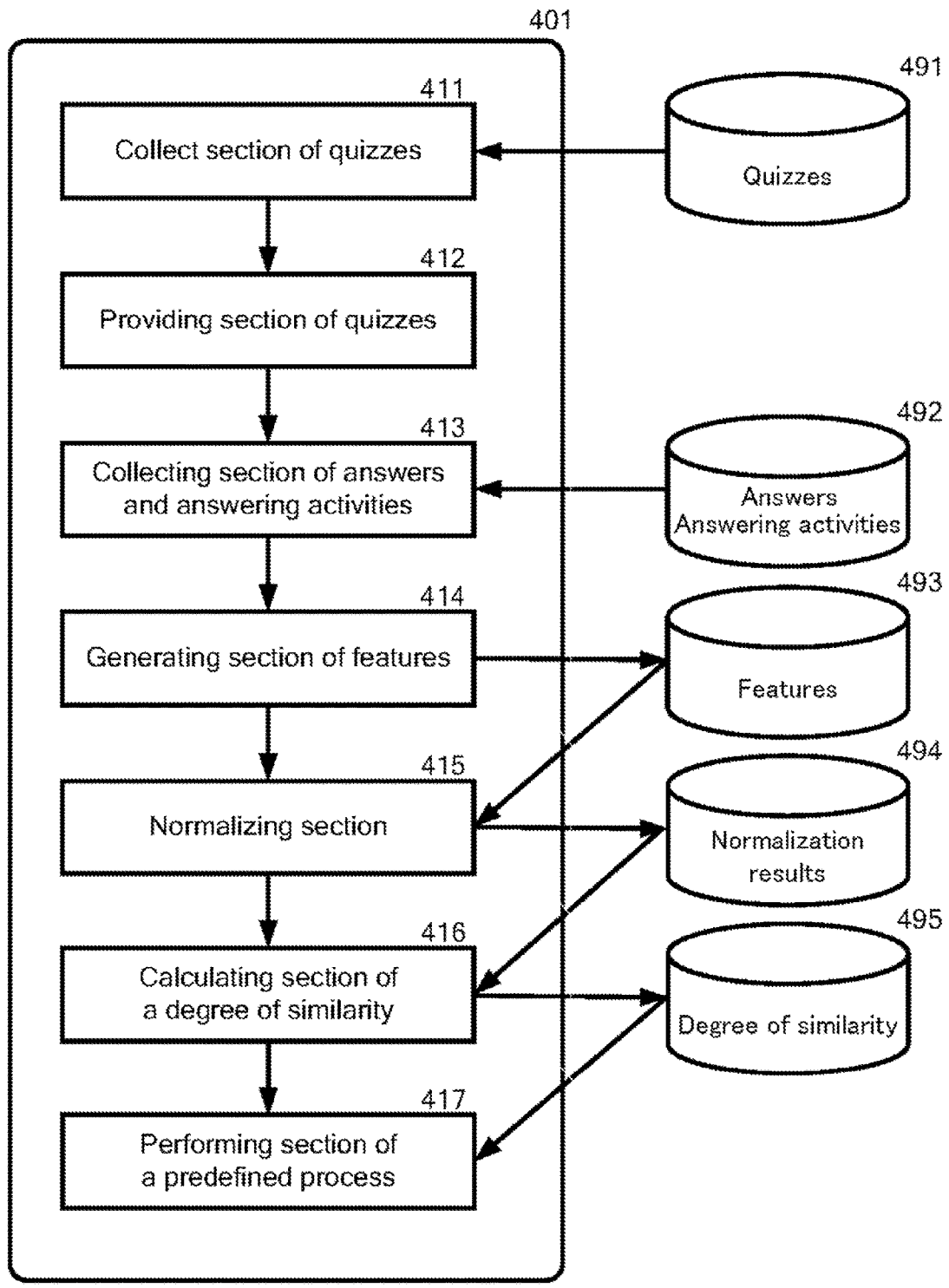
FIG. 4 illustrates an embodiment of an overall functional block diagram of a computer system hardware used in accordance with the embodiment of the flowcharts described in FIGS. 2A and 2B.

With reference not to FIG. 4, FIG. 4 illustrates an embodiment of an overall functional block diagram of a computer system hardware used in accordance with the embodiment of the flowcharts described in FIGS. 2A and 2B.

The system (401) may correspond to the computer (101) described in FIG. 1.

The system (401) comprises a collect section of quizzes (411), a providing section of quizzes (412), a collecting section of answers and answering activities (413), and a calculating section of a degree of similarity (416).

The system (401) may further comprise a generating section of features (414) and, optionally, a normalizing section (415).

The system (401) may further comprise a performing section of a predefined process (417).

The collect section of quizzes (411) may collect one or more quizzes from one or more users as a preparer to store the one or more quizzes into a storage (491).

The collect section of quizzes (411) may perform step 202 described in FIG. 2A.

The providing section of quizzes (412) may read the quizzes from the storage (491) and present the collected quizzes to one or more users as an answerer.

The providing section of quizzes (412) may perform step 203 described in FIG. 2A.

The collecting section of answers and answering activities (413) may collect answers to the provided quizzes from the one or more answerers. The collecting section of answers and answering activities (413) may further collect on one or more answering activities of the one or more answerers to store the one or more answering activities into a storage (492).

The collecting section of answers and answering activities (413) may perform step 204 described in FIG. 2A.

The generating section of features (414) may read the answering activities from the storage (492) and generate one or more features from the answerer activities to store the one more features into a storage (493).

The generating section of features (414) may perform steps 212 to 215 and 218 described in FIG. 2B.

The normalizing section (415) may read the feature from the storage (493) and perform normalization on at least one of the average response time and the average number of web pages by standard deviation of results by one answerer, standard deviation of all results for one quiz, or standard deviation of results for the quizzes by one preparer to store the normalization results into storage (494).

The normalizing section (415) may perform step 216 described in FIG. 2B.

The calculating section of a degree of similarity (416) may read the features and the normalization results from the storages (493 and 494) and calculate, for each pair of the one or more preparers and the one or more answerers, a degree of similarity of knowledge background, based on one or more answering activities of the one or more answerers to store a degree of similarity into a storage (495).

The calculating section of a degree of similarity (416) may read the features and the normalization results from the storages (493 and 494) and calculate, for each pair of the one or more preparers and the one or more answerers, a degree of similarity of knowledge background, based on the one or more features to store a degree of similarity into a storage (495).

The calculating section of a degree of similarity (416) may read the features and the normalization results from the storages (493 and 494) and calculate, for each pair of the one or more preparers and the one or more answerers, a degree of similarity of knowledge background, based on the normalization result to store a degree of similarity into a storage (495).

The calculating section of a degree of similarity (416) may perform step 217 described in FIG. 2B.

The performing section of a predefined process (417) may read the degrees of similarity from the storage (495) and perform a predefined process as follows: a process for clustering the users according to the degrees of similarity, a process for selecting one or more pairs of the one or more preparers and the one or more answerers having a predetermined degree of similarity, a process for selecting one or more pairs of the one or more preparers and the one or more answerers having a predetermined threshold or more of a degree of similarity, or a process for sorting the users according to the degrees of similarity.

The performing section of a predefined process (417) may perform step 219 described in FIG. 2B.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The expression "comprise(s)/comprising a/one" should be understood as "comprise(s)/comprising at least one".

The expression "comprise(s)/comprising" should be understood as "comprise(s)/comprising at least".

The expression "/" should be understood as "and/or".

What is claimed is:

1. A computer-implemented method for grouping users based on a degree of similarity of knowledge background of the users to improve a question-answer computer system, the method comprising:
    collecting one or more quizzes each including one or more questions from one or more of the users designated as preparers, the one or more quizzes being collected via one or more first graphical user interfaces displayed on one or more first web pages provided across at least one network to one or more first user terminals associated with the one or more preparers;
    wherein a first graphical user interface associated with a given one of the one or more preparers includes:
        an area for the given preparer to input a question;
        a list of answers provided by an administrator of the question-answer computer system; and
        user identification information corresponding to the given preparer;
    providing he collected quizzes to one or more of the users designated as answerers;
    collecting one or more answering activities to the provided quizzes from the one or more answerers, the one or more answering activities being collected via one or more second graphical user interfaces displayed on one or more second web pages provided across the at least one network to one or more second user terminals associated with the one or more answerers;
    wherein a second graphical user interface associated with a given one of the one or more preparers includes:
        an area for displaying a question to the given answerer;
        an area for the given answerer to input an answering activity; and
        user identification information corresponding to the given answerer;
    calculating, for each pair of the one or more preparers and the one or more answerers, a degree of similarity of knowledge background based on the one or more answering activities; and
    generating data for training the question-answer computer system based on the degrees of similarity of knowledge background, including grouping the users according to the degrees of similarity.

2. The method according to claim 1, wherein grouping the users according to the degrees of similarity includes performing at least one operation selected from the group consisting of: clustering the users according to the degrees of similarity of knowledge background, selecting one or more pairs of the one or more preparers and the one or more answerers having at least a predetermined threshold degree of similarity of knowledge background, and sorting the users according to the degrees of similarity of knowledge background.

3. The method according to claim 1, further comprising generating one or more features indicative of a knowledge background of the one or more answerers calculated from the answerer activities, the degrees of similarity of knowledge background being calculated based on the one or more features.

4. The method according to claim 3, wherein the one or more features include at least one feature selected from the group consisting of: at least one of a correct answer ate of each answerer, an average response time for each answerer to reach correct answers, and the average number of web pages that each answerer referred to before reaching correct answers.

5. The method according to claim 4, further comprising normalizing at least one of the average response time and the average number of web pages by standard deviation of results by one answerer, standard deviation of all results for one quiz, or standard deviation of results for the quizzes by one preparer, the degrees of similarity of knowledge background being calculated based on the normalization result.

6. The method according to claim 1, wherein the degree of similarity of knowledge background of the given answerer is calculated on condition that the given answerer provides at least a predetermined number of answering activities to the one or more questions of the corresponding quiz.

7. A system for grouping users based on a degree of similarity of knowledge background of the users to improve a question-answer computer system, the system comprising:
a memory storing a program, which, when executed on the processor, performs an operation comprising:
collecting one or more quizzes each including one or more questions from one or more of the user users designated as preparers, the one or more quizzes being collected via one or more first graphical user interfaces displayed on one or more first web pages provided across at least one network to one or more first user terminals associated with the one or more preparers;
wherein a first graphical user interface associated with a given one of the one or more preparers includes:
an area for the given preparer to input a question;
a list of answers provided by an administrator of the question-answer computer system; and
user identification information corresponding to the given preparer;
providing e collected quizzes to one or more of the users designated as answerers;
collecting one or more answering activities to the provided quizzes from the one or more answerers, the one or more answering activities being collected via one or more second graphical user interfaces displayed on one or more second web pages provided across the at least one network to one or more second user terminals associated with the one or more answerers;
wherein a second graphical user interface associated with a given one of the one or more preparers includes:
an area for displaying a question to the given answerer;
an area for the given answerer to input an answering activity; and
user identification information corresponding to the given answerer;
calculating, for each pair of the one or more preparers and the one or more answerers, a degree of similarity of knowledge background based on the one or more answering activities; and
generating data for training the question-answer computer system based on the degrees of similarity of knowledge background, including grouping the users according to the degrees of similarity.

8. The system according to claim 7, wherein grouping the users according to the degrees of similarity includes performing at least one operation selected from the group consisting of: clustering the users according to the degrees of similarity of knowledge background, selecting one or more pairs of the one or more preparers and the one or more answerers having at least a predetermined threshold degree of similarity of knowledge background, and sorting the users according to the degrees of similarity of knowledge background.

9. The system according to claim 7, the operation further comprising generating one or more features indicative of a knowledge background of the one or more answerers calculated from the answerer activities, the degrees of similarity of knowledge background being calculated based on the one or more features.

10. The system according to claim 9, wherein the one or more features include at least one feature selected from the group consisting of: at least one of a correct answer rate of each answerer, an average response time for each answerer to reach correct answers, and the average number of web pages that each answerer referred to before reaching correct answers.

11. The system according to claim 10, the operation further comprising normalizing at least one of the correct answer rate, the average response time and the average number of web pages by standard deviation of results by one answerer, standard deviation of all results for one quiz, or standard deviation of results for the quizzes by one preparer, the degrees of similarity of knowledge background being calculated based on the normalization result.

12. The system according to claim 7, wherein the degree of similarity of knowledge background of the given answerer is calculated on condition that the given answerer provides at least a predetermined number of answering activities to the one or more questions of the corresponding quiz.

13. A computer program product for grouping users based on a degree of similarity of knowledge background of the users to improve a question-answer computer system, the computer program product comprising a computer usable storage medium having program instructions embodied therewith, wherein the computer readable storage medium is not a transitory signal per se, the program instructions executable by a computer to cause the computer to perform a method comprising:
collecting one or more quizzes each including one or more questions from one or more of the users designated as preparers, the one or more quizzes being collected via one or more first graphical user interfaces displayed on one or more first web pages provided across at least one network to one or more first user terminals associated with the one or more preparers;
wherein a first graphical user interface associated with a given one of the one or more preparers includes:

an area for the given preparer to input a question;
a list of answers provided by an administrator of the question-answer computer system; and
user identification information corresponding to the given preparer;
providing the collected quizzes to one or more of the users designated as answerers;
collecting one or more answering activities to the provided quizzes from the one or more answerers, the one or more answering activities being collected via one or more second graphical user interfaces displayed on one or more second web pages provided across the at least one network to one or more second user terminals associated with the one or more answerers;
wherein a second graphical user interface associated with a given one of the one or more preparers includes:
an area for displaying a question to the given answerers
an area for the given answerer to input an answering activity; and
user identification information corresponding to the given answerer;
calculating, for each pair of the one or more preparers and the one or more answerers, a degree of similarity of knowledge background based on the one or more answering activities; and
generating data for training the question-answer computer system based on the degrees of similarity of knowledge background, including grouping the users according to the degrees of similarity.

14. The computer program product according to claim 13, wherein grouping the users according to the degrees of similarity includes performing at least one operation selected from the group consisting of: clustering the users according to the degrees of similarity of knowledge background, selecting one or more pairs of the one or more preparers and the one or more answerers having at least a predetermined threshold degree of similarity of knowledge background, and sorting the users according to the degrees of similarity of knowledge background.

15. The computer program product according to claim 13, the method further comprising generating one or more features indicative of a knowledge background of the one or more answerers calculated frown the answerer activities, the degrees of similarity of knowledge background being calculated based on the one or more features.

16. The computer program product according to claim 15, wherein the one or more features include at least one feature selected from the group consisting of: at least one of a correct answer rate of each answerer, an average response time for each answerer to reach correct answers, and the average number of web pages that each answerer referred to before reaching correct answers.

17. The computer program product according to claim 16, the method further comprising normalizing at least one of the correct answer rate, the average response time and the average number of web pages by standard deviation of results by one answerer, standard deviation of all results for one quiz, or standard deviation of results for the quizzes by one preparer, the degree of similarity of knowledge background being calculated based on the normalization result.

18. The computer program product according to claim 13, wherein the degree of similarity of knowledge background of the given answerer is calculated on condition that the given answerer provides at least a predetermined number of answering activities to the one or more questions of the corresponding quiz.

\* \* \* \* \*